(No Model.)
M. B. FRISBIE.
TRACE CARRIER.
No. 320,549. Patented June 23, 1885.
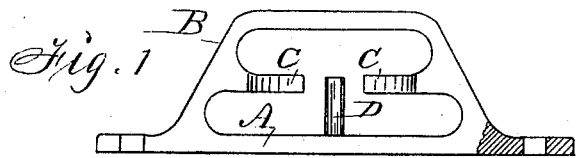
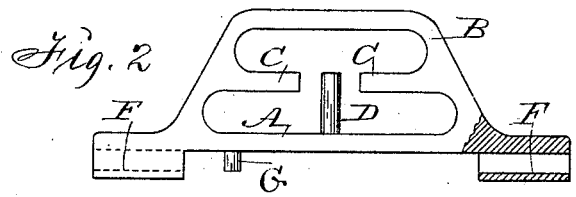
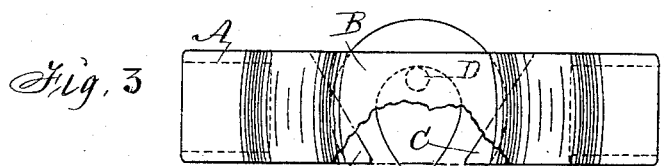
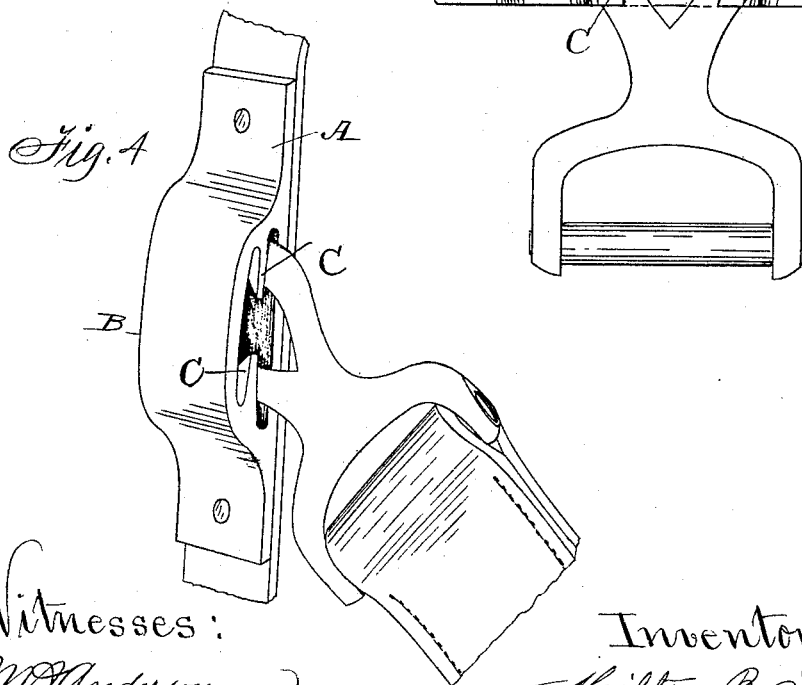
Witnesses:
W. T. Anderson,
C. D. Hidgens
Inventor:
Milton B. Frisbie,
By Thomas C. Orwig, Attorney.

UNITED STATES PATENT OFFICE.

MILTON B. FRISBIE, OF WALNUT, IOWA.

TRACE-CARRIER.

SPECIFICATION forming part of Letters Patent No. 320,549, dated June 23, 1885.

Application filed April 13, 1885. (No model.)

*To all whom it may concern:*

Be it known that I, MILTON B. FRISBIE, a citizen of the United States of America, and a resident of Walnut, in the county of Pottawattamie and State of Iowa, have invented an Improved Trace-Carrier, of which the following is a specification.

Heretofore trace-carriers of various shapes have been combined with the back-straps of harness in such a manner that the cockeyes on the ends of the traces on the opposite sides of a horse could both be detachably connected with the trace-carrier on top of the animal's back. But it is difficult for boys and small persons to reach a trace-carrier on the top of a horse's back, and my object is to provide trace-carriers adapted to be attached to the hip or breeching straps of harness in such a manner that they will be on the opposite sides of a horse and within easy reach of a boy, so that the cockeye on the ends of the traces can be readily attached and detached, as required, in hitching and unhitching.

My invention consists in the construction and combination of a pair of trace-carriers with the hip or breeching straps of a harness, as hereinafter set forth, pointed out in my claims, and illustrated in the accompanying drawings, in which—

Figure 1 is a front view of one of my devices that is adapted to be fixed to a leather strap by means of rivets. Fig. 2 is a back view of the same, showing loops on its ends and a tongue on its under side adapting it to be adjustably and detachably connected with a strap. Fig. 3 is a top view showing parts broken away and a cockeye attached. Fig. 4 is a perspective view showing the device attached to the hip or breeching strap of a harness and the cockeye on the end of a trace attached thereto, as required, to suspend the trace.

A is the flat base; B, an arch; C C, horizontal and triangular-shaped projections, and D a tongue, cast integral with each other. By simply providing the ends of the base with perforations to admit rivets the device composed of those integral parts will be complete and ready to fasten to a hip or breeching strap in a harness by means of two rivets.

By providing the base with loops F at its ends and a tongue, G, between the loops, as shown in Fig. 2, the device can be readily adjustably connected with a leather strap having perforations to admit the tongue.

My trace-carrier thus constructed may vary in size as required, to retain cockeyes of different sizes, and it may be japanned or finished in any style of art known for finishing saddlery hardware.

In the practical use of my invention, when I desire to suspend a trace, I simply pass the free end of the cockeye on the end of the trace through the arch B and over the horizontal projections C far enough to allow it to drop down between the projections C and over the tongue D into the space under the projections C. The weight of the trace will draw it backward to rest against the tongue. In this position the projections C will prevent vertical movement, and the tongue will prevent its escape, and the trace will sag and draw the cockeye into an inclined position relative to the back-strap and carrier, as required, to hang gracefully aside of the horse.

To detach the trace I simply push the cockeye backward far enough to allow it to be raised above the top of the tongue and the horizontal projections C, so that it can escape from under the arch B.

I claim as my invention—

A metal trace-carrier composed of a flat base, A, having perforations or loops at its ends, an integral arch, B, having triangular-shaped projections C, and a tongue, D, extending vertically from the base A, in combination with a hip-strap in a harness, for the purposes stated.

MILTON B. FRISBIE.

Witnesses:
 J. H. HENRY,
 I. T. SPANGLER.